W. H. SHIPLER.
RIVET SET RETAINER.
APPLICATION FILED JAN. 2, 1915.
1,140,536.
Patented May 25, 1915.
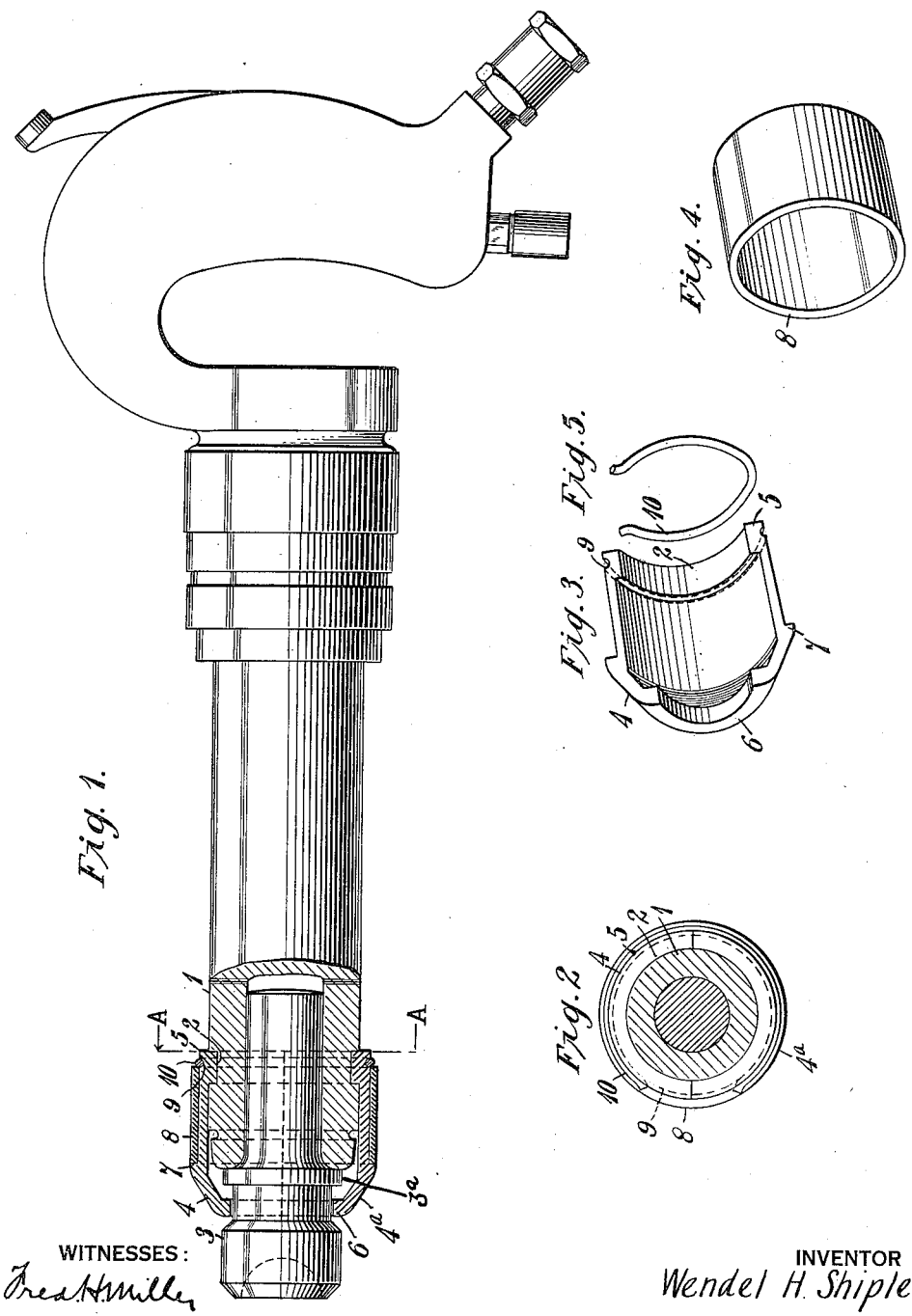
WITNESSES:
INVENTOR
Wendel H. Shipler
BY
ATTORNEY

UNITED STATES PATENT OFFICE.

WENDEL H. SHIPLER, OF NEW CASTLE, PENNSYLVANIA.

RIVET-SET RETAINER.

1,140,536.

Specification of Letters Patent. Patented May 25, 1915.

Application filed January 2, 1915. Serial No. 247.

*To all whom it may concern:*

Be it known that I, WENDEL H. SHIPLER, a citizen of the United States, residing at New Castle, in the county of Lawrence, and State of Pennsylvania, have invented certain new and useful Improvements in Rivet-Set Retainers, of which the following is a specification.

This invention relates to pneumatic riveting devices, air hammers and the like, and has for its object the provision of means for preventing the rivet set or other tool from being thrown from the riveter.

Since the rivet set or tool used is necessarily slipped loosely into the barrel of the riveter, it may occasionally be violently thrown out with sufficient force to seriously injure persons nearby. In addition—considerable inconvenience may be caused by the loss of the rivet set or tool. In order to overcome this difficulty, I have provided a retainer which rigidly holds the rivet set in place, but provides sufficient clearance to permit of free operation of the tool and which may be applied with equal ease, irrespective of the size of the head of the tool used. The latter point is of considerable importance, as it is frequently necessary to use a tool, the working portion of which is as large, or larger, than the shank of the riveter, and the retainer must permit the ready insertion or removal of the tool and still provide the necessary protection. It will therefore, be evident that retaining devices which are designed to slip over the head of the tool, do not meet all necessary requirements, as they cannot be used with all tools.

It is well known that the vibration, due to the operation of the tool, is so extreme that no screws nor screw joints can be depended upon for a permanent fastening, as they may become loose. Further—screw joints are subject to rusting or sticking and when in this condition, are very inconvenient to adjust without equipment and prevent the ready exchange of working tools with the riveter.

To overcome the objections cited and provide the advantages outlined, as well as for other purposes, I have devised the retainer illustrated in the drawing.

Figure 1 is a sectional elevation of my invention, applied to a riveter, while Fig. 2 is a section through the line "AA" of Fig. 1. Fig. 3 is a detail of one of the guard members; Fig. 4 is a detail of the retaining ring; Fig. 5 is a detail of the locking spring.

In the drawings, (1) represents any commercial riveter which is unchanged, except that a groove (2) is cut around its lower end, as shown. A rivet set (3) is illustrated in place. This may be any standard tool, and is provided with the flange (3ª) to limit its travel. A split ring (4—4ª) is shaped to fit around the lower end of riveter (1), being equipped with a projection (5), which falls into groove (2), thus preventing the retainer from being driven off the riveter. At the other end of the split ring (4—4ª) is an extension or collar (6), of such size that the shoulder on the standard rivet set or tool employed cannot pass through. The split ring (4—4ª) is provided with a shoulder (7) and a continuous sleeve (8) is arranged to slip over the two sections of the split ring, thereby, preventing them from separating and also holding the sections to the riveter barrel. One end of the split ring (4—4ª) is grooved at (9) and the spring wire (10), is provided to snap into said groove, thereby preventing the removal of the sleeve (8) and thus holding the retaining device in place.

It will be evident from this description that the device illustrated provides a readily detached retainer for riveters, which prevents the throwing out of the tools. The retainer may also be applied with any tool and when once applied, cannot be shaken loose by the vibration to which the tool may be subjected.

Having now fully described my invention, which I claim as new and desire to secure by Letters Patent is as follows;

1. In a pneumatic tool retainer, a split ring constructed to interlock with the tool and barrel of said pneumatic tool, a continuous ring member arranged to slip over said split ring, and a spring member adapted to prevent the withdrawal of the said continuous ring member.

2. The combination of a pneumatic riveter barrel, grooved at the tool end, a flanged tool for said riveter, a split ring having a collar for engaging said flanged tool; a sleeve enveloping said split ring, and a spring member for holding said sleeve in position.

In testimony whereof I affix my signature in presence of two witnesses.

WENDEL H. SHIPLER.

Witnesses:
SAMUEL HOOD,
I. J. KING.